Figure 1:
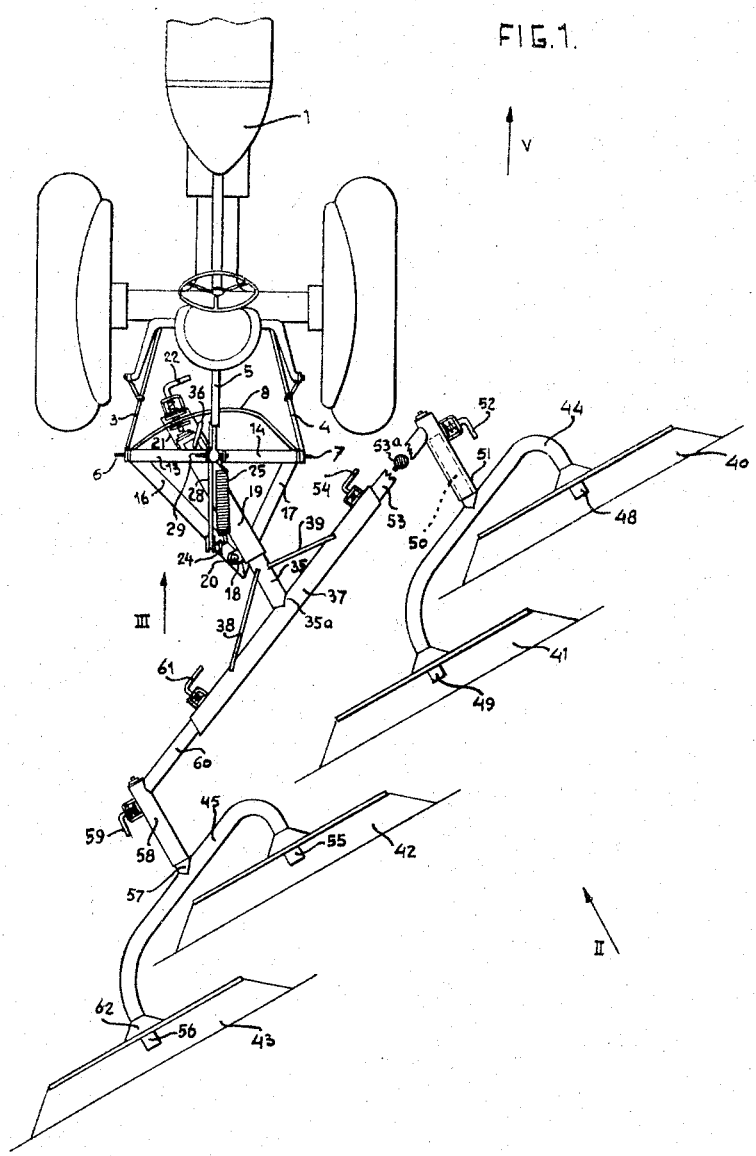

July 28, 1959  C. VAN DER LELY ET AL  2,896,392
SIDE DELIVERY RAKING DEVICE
Filed Jan. 25, 1956  3 Sheets-Sheet 1

July 28, 1959  C. VAN DER LELY ET AL  2,896,392
SIDE DELIVERY RAKING DEVICE

Filed Jan. 25, 1956  3 Sheets-Sheet 2

United States Patent Office 2,896,392
Patented July 28, 1959

2,896,392
SIDE DELIVERY RAKING DEVICE

Cornelis van der Lely and Ary van der Lely, Maasland, Netherlands, assignors to C. van der Lely N.V., Maasland, Netherlands, a limited-liability company of the Netherlands Application January 25, 1956, Serial No. 561,298
Claims priority, application Netherlands February 24, 1955

17 Claims. (Cl. 56—377)

The invention relates to a device for laterally displacing material lying on the ground by means of at least four raking members fixed rotatably to the frame of the device which has a working position in which upon moving the device in a suitable direction each of the raking members works independent of one another the material lying on a narrow strip of land, so that therefore the device can serve as a teddering device. Devices of this kind are generally known. Devices of this known kind are already proposed in which the device may also be used as a side delivery rake, the transformation requiring however in one as well as in the other direction radical measures. However, no devices of the abovementioned kind are known which if desired may also be used as a swath turner.

It is an object of the invention to provide a device of the above-mentioned kind which can be used as a swath turner at the same time. According to the invention the device is such that the raking members are divided into a number of groups, for each group an intermediate frame being arranged to which each of the raking members of the group in question is fixed rotatably about a proper axis of rotation, whereas each intermediate frame is connected to the frame by means of a shaft with joint which is nearly parallel to the axes of rotation of the raking members in question, all this in such a way that each intermediate frame is rotatable at an angle of nearly 180° in relation to the frame about the shaft with joint in the working position as a teddering device. A similar device can be changed in a very simple way from a teddering device into a swath turner, because the intermediate frames only need to be turned 180° around their shafts with joint.

Another object of the invention is to provide a raking implement attached to the lifting device of a tractor, in which the angular position of the raking members with regard to the travelling direction can be adjusted in a simple manner.

Still another object of the invention is to provide a raking implement attached to a vehicle with a row of raking members, which are connected to the vehicle in a particular manner which allows an elevational movement of the raking member by their contact with the ground.

Figure 2:
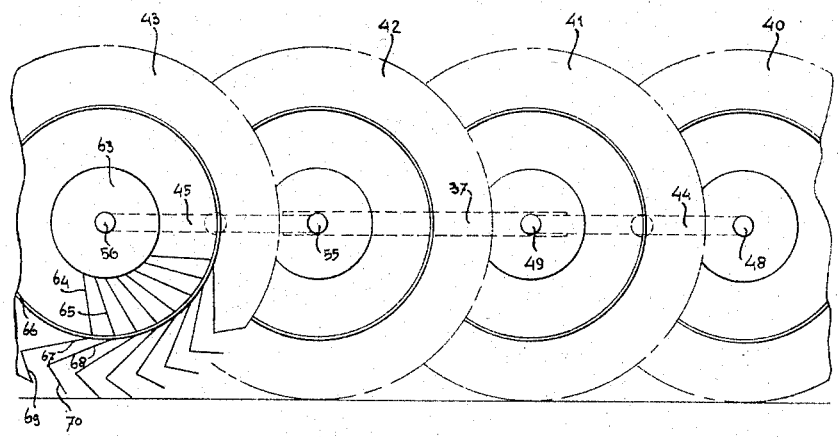
Figure 3:
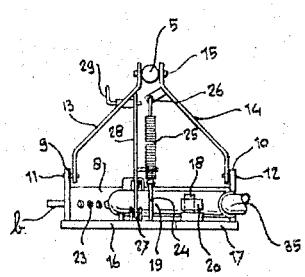
Figure 5:
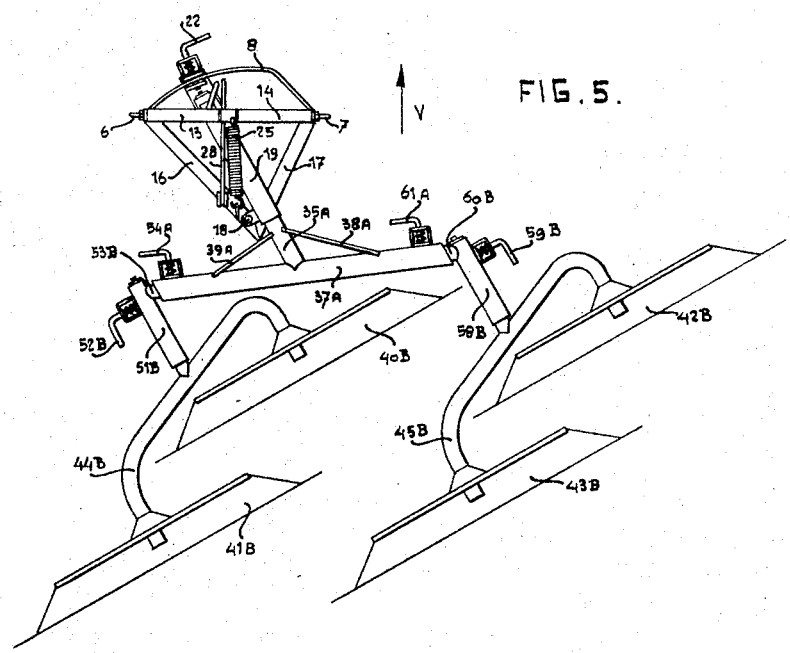
Figure 4:
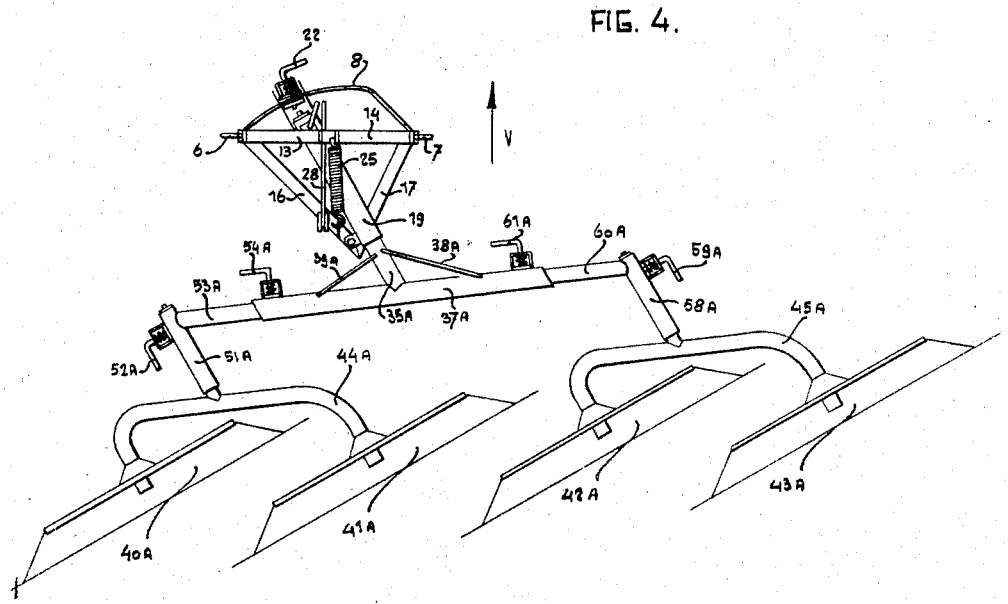

Further features and details will be hereinafter more fully described with reference to the accompanying drawing in which a preferred embodiment of the device according to the invention has been illustrated by way of example and in which:

Fig. 1 shows a plan view of a device according to the invention in a working position in which the device constitutes a side delivery rake, said device being fixed to the lifting device of a tractor, Fig. 2 shows a side elevation of the device according to Fig. 1 viewed in the direction of the arrow II, Fig. 3 shows a rear elevation of the fastening device with parts broken away and with which the device is fastened to the lifting device of the tractor, Fig. 4 is a plan view of the device according to Fig. 1 in a working position in which the device constitutes a teddering device, Fig. 5 represents a plan view of the device according to Fig. 1 in a third working position in which the device constitutes a swath turner.

According to Fig. 1 a tractor 1 is arranged provided at its rear side with a lifting device which has two bars 3 and 4 located in one single plane, as well as a bar 5 located at a higher elevation. A bow 8 is supported by the bars 3 and 4 (see also Fig. 3) by means of two hinge pins 6 and 7. The extremities of the bow 8 carry vertical projections 9 and 10 provided with horizontal pins 11 and 12. Bars 13 and 14 directed obliquely upwards are able to hinge about the pins 11 and 12 which are in alignment. The upper ends of the bars 13 and 14 are connected to the rear end of the bar 5 by means of a horizontal hinge pin 15. The extremity of the bow 8 carrying the pin 6 or 7, respectively, is connected to an extremity of a horizontal bar 16 or 17, respectively. The bars 16 and 17 meet each other and are connected to each other close to a vertical hinge pin 18 which is mounted upon the bar 16. A horizontal tube 19 carries at its rear end an eye 20 being capable to hinge about the vertical pin 18. The foremost extremity of the tube 19 is provided at its lower side with a strip 21 extending under the bow 8 and provided with a locking means having a locking pin 22 which can be put through any hole of a series of holes 23 in the bow 8. In this way the tube 19 can therefore be secured in various horizontal directions. Close to the pin 18 the bar 16 carries a projection 24 to which the lower extremity of a drawspring 25 is fastened. The upper extremity of said drawspring is attached to an eye 26 which is fixed to the bar 14. Moreover, at 27 a bar 28 being provided with a large number of holes is attached to the bar 16. The bar 13 carries a locking pin 29 which can co-operate with each of said holes in the bar 28. In this way the angle between the plane of the bars 16 and 17 and the plane of the bars 13 and 14 can be given various values. The tube 19 constitutes a bearing for a coupling axle 35 which can be secured in this tube 19 by means of a locking device 36 in two positions differing 180°. The rear side of the axle 35 is connected at 35a to the middle of a frame tube 37. Supporting bars 38 and 39 reinforce the connection between the axle 35 and the tube 37. The tube 37 constitutes a frame to which two raking members or free-wheeling rake wheels 40 and 41 are fastened (see Fig. 2) through an intermediate frame or yoke 44 and two raking members 42 and 43 through an intermediate frame 45. The intermediate frame 44 is composed of a bar, the ends of which are bent in the same direction and constituting axles of rotation 48 and 49 for the raking members 40 and 41. The middle of the bar 44 carries an axle 50 which is parallel to the axles 48 and 49 and which is supported in a support tube 51. The yoke axle 50 extends nearly through the centre of gravity of the group of rake wheels and can be secured by means of a locking pin 52 inserted in radial holes (not shown) in two positions in axle 50 mutually differing by 180°. The foremost end of the tube 51 is connected to a bar 53 which is sliding in the foremost end of the tube 37. The section of the bar 53 has a shape which is not circular and the section of the tube 37 has internally a shape which is corresponding not circular so that the bar 53 cannot revolve in the tube 37, but the axle 51 remains ever parallel to the axle 35. For example, the bar 53 includes key means 53a to prevent rotation. A locking pin 54 can be used to secure the bar 53 in a number of holes (not shown) various positions axially spaced along axle 51 so that it will be possible to work with various distances between the axles 51 and 35. The raking members 42 and 43 are connected in a similar way to the frame 37 and that is that they are mounted upon parallel axles 55 and 56 constituting extremities of the intermediate frame 45, whereas the shaft with joint 57 for the intermediate frame 45 is supported in a tube 58 provided with a locking pin 59, whereas further the tube 58 is fastened to a bar 60 which is sliding in the tube 37. The bar 60 has a section which is not circular and said bar can be secured in a number of positions by means of the locking pin 61. All of the raking members are of the same construction which will be described for the raking member 43. This raking member is composed of a hub 62 (see Fig. 1) to which the disc 63 is fixedly connected. The disc 43 carries a great number of flexible spokes, as 64 and 65, which are led through openings in a rim 66 and which outside of that rim are sharply bent so as to constitute supporting means, as 69 and 68, for tines, as 69 and 70.

In the position according to Figs. 1 and 2 the device here given as an example of an embodiment constitutes a side delivery rake. If the device is moved on in the direction of the arrow V, the raking member 40 delivers material lying on the ground to the left which material is delivered farther to the left by means of the following raking members 41, 42 and 43.

If the device is raised from the ground up till a sufficient height by means of the lifting device of the tractor 1 and if the locking pin 36 has been lifted, it will be possible to rotate the frame 37 and the axle 35 at an angle of 180° in the tube 19. By this the device will occupy the position shown in Fig. 4 in which the parts having changed their position are indicated with the same reference numerals as in Fig. 1, on the understanding that an A is added thereto. When further the device has been let down again till the raking members 40A—43A are in touch with the ground and when the device is moved on in the direction of the arrow V, said device works as a teddering device, because independent of one another all raking members displace the material located upon small strips of land, at a small distance to the left.

If further it is desired to use the device as a swath turner, the device has to be raised anew by means of the lifting device, but now up till a smaller height than while changing the side delivery rake into a teddering device. Then the locking pin 52A is pulled outwards, the intermediate frame 44A is revolved 180° and the pin 52A is brought back again into its original position. After that the locking pin 54A is pulled out and the bar 53A is slid into the tube 37A. In a similar way the intermediate frame 55A is turned 180° and is slid to the left. By this a working position of the device comes into existence which is shown in Fig. 5. The parts of the device have the same reference numerals as in Fig. 4, except for the parts which have changed their position, but for which the character A behind the reference numeral has changed in to a B. When the device is moved on in this working position in the direction of the arrow V, it will be possible to deliver a swath to the left by means of the raking member 40B, said swath being delivered further to the left by means of the raking member 41B, after which said swath will be reversed. It will be possible to deliver another swath to the left by means of the raking member 42B, by which said swath can be delivered still further to the left by means of the raking member 43B. It will be evident that bringing the tubes 51A and 58A towards each other may be left undone when two swaths being mutually interspaced sufficiently are desired to be reversed. By changing the position of the tube 19 and by causing it to rotate about the pin 18 the device can be adapted to various widths of the swath.

Moreover it will be evident that it is very well possible to change directly from the working position shown in Fig. 1 to the working position shown in Fig. 5 without changing the device first into the working position as a teddering device.

When it is desired to transport the device in any of the working positions described, it will be sufficient to raise the device to a certain height above the ground by means of the lifting device. In addition to that it is desirable that all locking pins will function then. When on the other hand the device is running it may be recommendable not to have the locking pins 36, 52 and 59 working, in which case the pressures of all four raking members on the ground will automatically become equally great. This is also obtained when the locking pins 36, 52 and 59 have a certain play in the holes. Part of the weight of the device rotatable about the axis of rotation defined by the pins 6 and 7 can be received by the drawspring 25 which in this way can work as a wheel pressure lightening device. It is possible to give the whole device a fixed position with regard to the tractor by means of the bar 28. This may be advantageous when the machine has to be lifted up to such a height that it can be changed from a side delivery rake into a teddering device or the reverse. At last it is remarked that the tines like 69 and 70, are always directed downwards in all working positions of the device at that side of a raking member which moves upwards while being in normal operation, so that the material displaced by these tines can easily fall from said tines as is necessary for a good raking action.

It is clear that the device in its various positions can be used also for other puurposes than are described hereinbefore. Especially the device is suited for being used as a cultivator and for weeding weeds.

What we claim is:

1. A device for displacing material lying on the ground and for attachment to a tractor comprising a coupling device connected to said tractor and including a horizontal tube angularly positionable with respect to the longitudinal axis of the tractor, a coupling axle in said tube and rotatable therein, a frame tube rigidly connected to said axle, bars slidable in said frame tube, support tubes rigidly fastened to said bars at an angle with respect thereto, said support tubes extending rearwardly of said frame tube, yokes including yoke axles in said support tubes for rotation therein, rake wheels supported on each of the yokes, all of said wheels being in linear alignment, first locking devices on said support tubes for locking the yoke axles against rotation in predetermined positions, and second locking devices on said frame tube for locking said bars against sliding in said frame tube and in determinable positions, the positions of said coupling axle, bars and yoke axles determining the mode of operation of the device.

2. A device as claimed in claim 1 wherein said bars include means to prevent rotation of the bars in said frame tube.

3. A device as claimed in claim 1 wherein said coupling device includes a lifting device coupled to said horizontal tube for elevating the same to facilitate a rotation of the coupling axle in the horizontal tube.

4. A device as claimed in claim 1 wherein said rake wheels are free-wheeling rake wheels which are rotated by contact with the ground.

5. A device as claimed in claim 1 comprising a locking device on said horizontal tube for locking the coupling axle against rotation.

6. A convertible side delivery rake, swath turner, or tedder for laterally displacing materials such as hay or other crops lying on the ground, comprising a tractor lift mechanism having longitudinally spaced bearing portions, elongated draft means having two parts, one of said parts being selectively rotatable relative to the other part, the first part of said draft means having bearing engagement with said bearing portions, a frame beam operatively connected to the second part of said draft means, said frame beam having at least two intermediate frames, rake wheels freely rotatably mounted on said intermediate frames on said frame beam for rotational movement about a substantially horizontal axis, whereby to invert the same, said frame beam being located between said rake wheels and said elongated draft means.

7. The device as claimed in claim 6 being provided with locking means for retaining said intermediate frames in at least two positions relative to said frame beam.

8. The device as claimed in claim 6 being provided with locking means including a locking pin for retaining the intermediate frames in rigid position relative to said frame beam.

9. The device as claimed in claim 6 wherein said frame beam comprises a tube means connecting said intermediate frames to said frame beam, and wherein said last named means comprises bars slidable within said tube, and means locking said bars in adjusted positions in said tube.

10. The device as claimed in claim 6 wherein said frame beam comprises a tube and means connecting said intermediate frames to said frame beam and means for locking said intermediate frames in adjusted positions lengthwise of said tube.

11. The device as claimed in claim 6 wherein each intermediate frame comprises a bar having bent ends, one of said ends being of greater amplitude of curvature than the other bent end of each bar, said rake wheels being mounted on said bent ends.

12. The device as claimed in claim 10 wherein each intermediate frame comprises a bar having bent ends, one of said ends being of greater amplitude of curvature than the other bent end of each bar, said rake wheels being mounted on said bent ends.

13. The device as claimed in claim 8 wherein each intermediate frame comprises a bar having bent ends, one of said ends being of greater amplitude of curvature than the other bent end of each bar, said rake wheels being mounted on said bent ends.

14. The device as claimed in claim 9 wherein each intermediate frame comprises a bar having bent ends, one of said ends being of greater amplitude of curvature than the other bent end of each bar, said rake wheels being mounted on said bent ends.

15. The device as claimed in claim 10 wherein each intermediate frame comprises a bar having bent ends, one of said ends being of greater amplitude of curvature than the other bent end of each bar, said rake wheels being mounted on said bent ends.

16. A device for displacing material lying on the ground and for attachment to a tractor comprising a coupling device connected to said tractor and including a horizontal tube angularly positionable with respect to the longitudinal axis of the tractor, a coupling axle in said tube and rotatable therein, a frame tube rigidly connected to said axle, bars slidable in said frame tube, support tubes rigidly fastened to said bars at an angle with respect thereto, said support tubes extending rearwardly of said frame tube, yokes including yoke axles in said support tubes for rotation therein, rake wheels supported on each of the yokes, first locking devices on said support tubes for locking the yoke axles against rotation in predetermined positions, and second locking devices on said frame tube for locking said bars against sliding in said frame tube and in determinable positions, the positions of said coupling axle, bars and yoke axles determining the mode of operation of the device.

17. The structure of claim 6 wherein one of said parts of said elongated draft means is constructed and arranged for rotation from one position to another position about an axis of rotation of substantially 180°, and means for locking said last named part loosely in either position whereby to allow play in said positions.

References Cited in the file of this patent

UNITED STATES PATENTS

| 2,621,465 | Klemm | Dec. 16, 1952 |
| 2,712,723 | Ryan | July 12, 1955 |

FOREIGN PATENTS

| 586,880 | Great Britain | Apr. 3, 1947 |
| 1,079,494 | France | May 19, 1954 |
| 1,080,088 | France | May 26, 1954 |